Dec. 30, 1924.
G. P. MILLER
1,521,116
MACHINE FOR BEVELING THE EDGES OF OPTICAL LENSES
Filed April 7, 1921     4 Sheets-Sheet 1
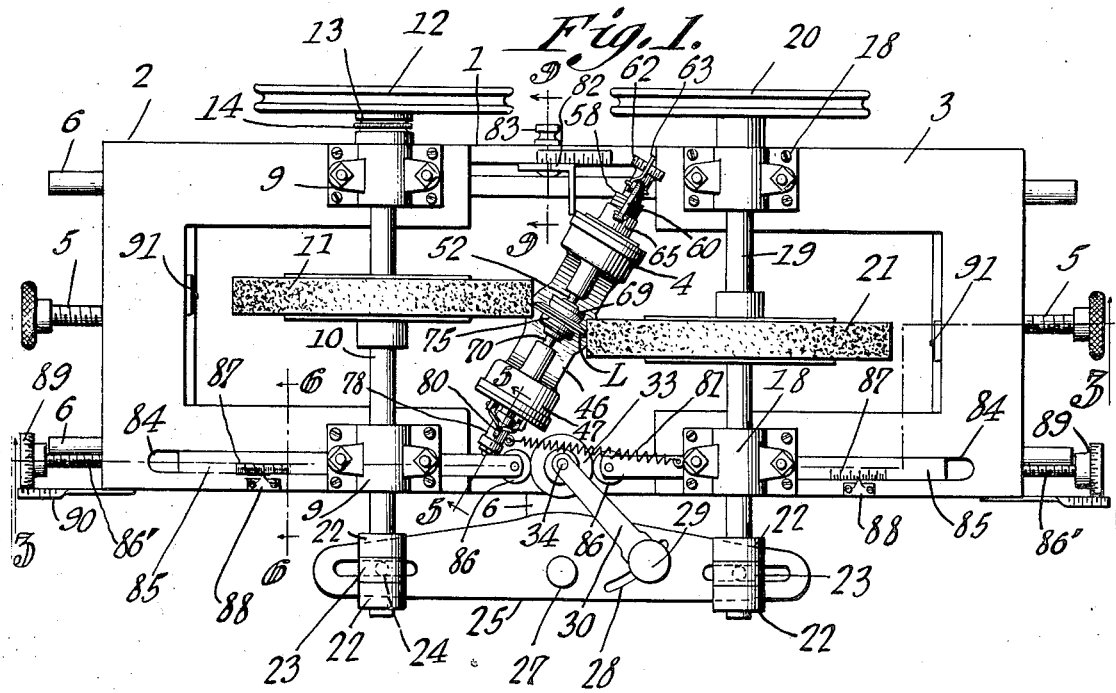
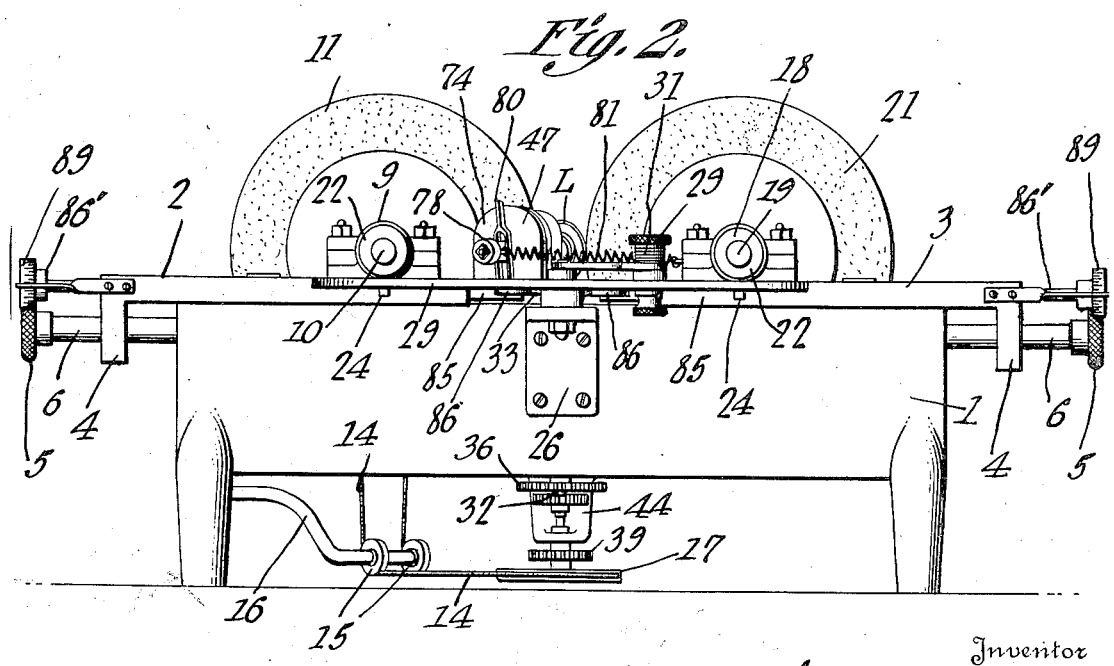
Inventor
G. P. Miller
By C. A. Snow & Co.
Attorney

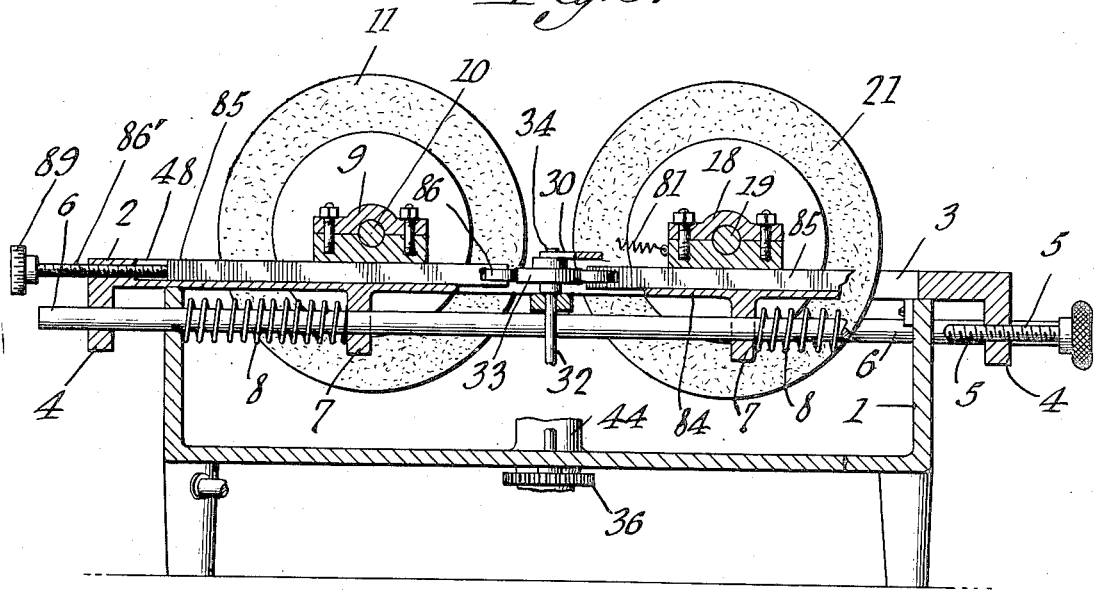
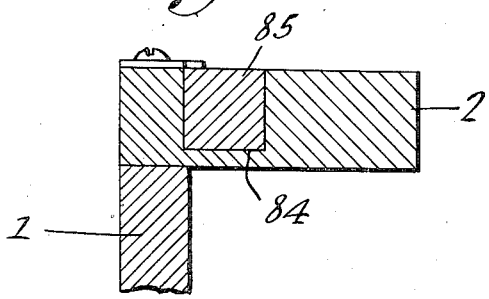
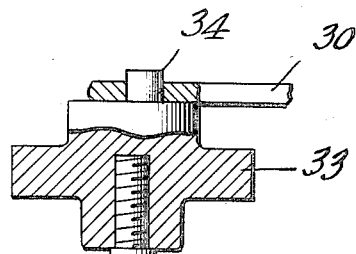
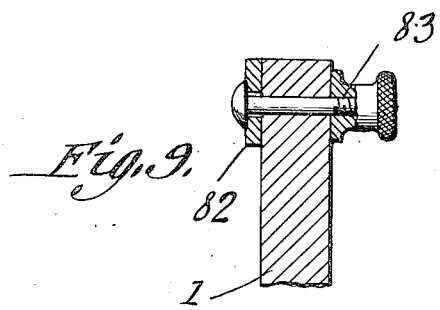

Dec. 30, 1924.

G. P. MILLER 1,521,116

MACHINE FOR BEVELING THE EDGES OF OPTICAL LENSES

Filed April 7, 1921 4 Sheets-Sheet 3

Inventor
G. P. Miller

By C. A. Snow & Co.
Attorneys

Dec. 30, 1924.  
G. P. MILLER  
1,521,116  
MACHINE FOR BEVELING THE EDGES OF OPTICAL LENSES  
Filed April 7, 1921  4 Sheets-Sheet 4
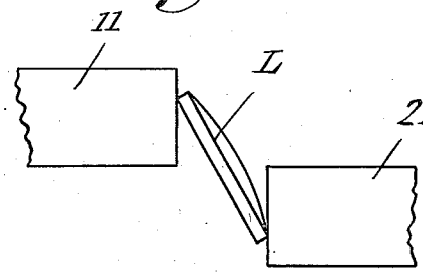
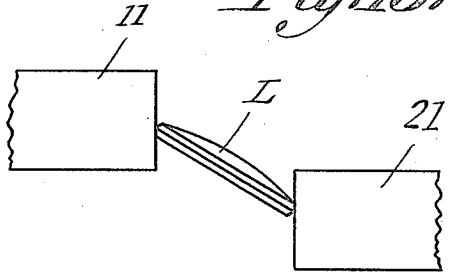
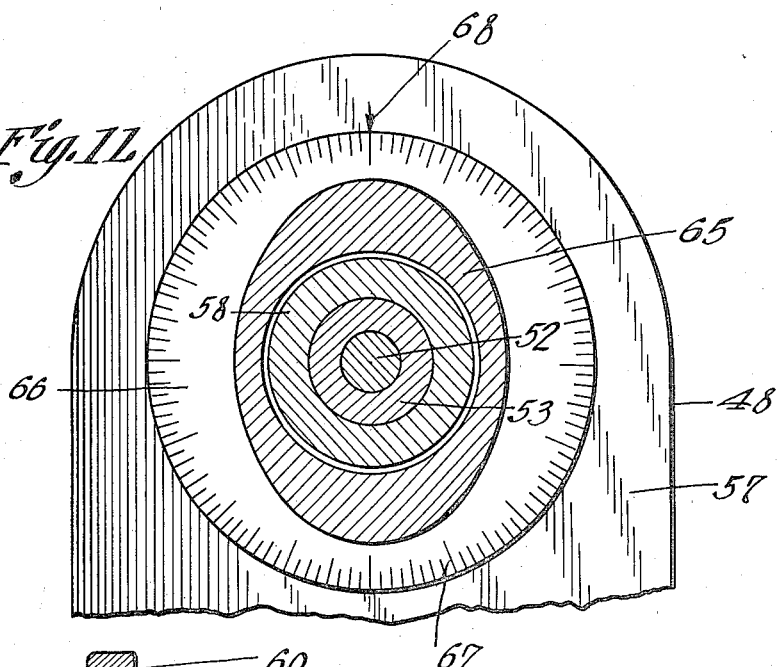
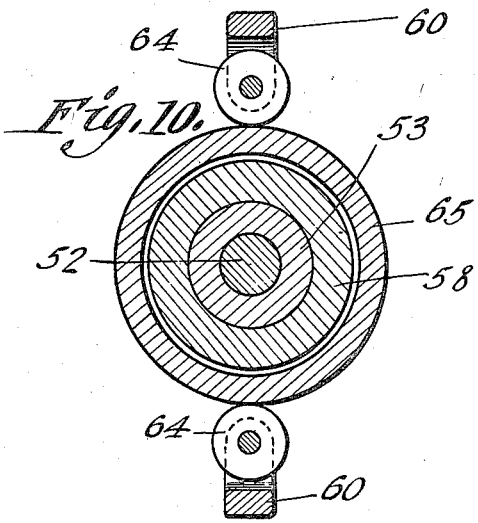
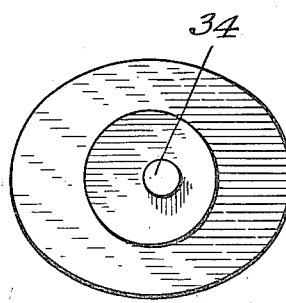
Inventor  
G. P. Miller  
By *[signature]*  
Attorneys Patented Dec. 30, 1924.

1,521,116

UNITED STATES PATENT OFFICE.

GEORGE P. MILLER, OF FOXCROFT, MAINE.

MACHINE FOR BEVELING THE EDGES OF OPTICAL LENSES.

Application filed April 7, 1921. Serial No. 459,449.

*To all whom it may concern:*

Be it known that I, GEORGE P. MILLER, a citizen of the United States, residing at Foxcroft, in the county of Piscataquis and State of Maine, have invented a new and useful Machine for Beveling the Edges of Optical Lenses, of which the following is a specification.

This invention relates to a machine for beveling the edges of optical lenses, one of its objects being to provide mechanism whereby a uniform bevel can be formed along the edge of a lens of any contour or configuration, the grinding action being automatic after the parts have been initially set.

A further object is to provide a machine which will simultaneously produce two bevels at the edge of a lens, the apex or angle between the beveled faces being spaced uniformly from the faces of the lens.

Another object is to provide a machine of this character which will bevel not only lenses of different shapes but also lenses of different sizes, the machine being readily adjustable to the different lenses.

Another object is to combine with the machine a means whereby the grinding wheels forming a part thereof can be dressed after becoming worn unevenly through use.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings

Figure 1 is a plan view of the machine.

Figure 2 is a side elevation thereof.

Figure 3 is a section on line 3—3, Figure 1.

Figure 6 is a section on line 6—6, Figure 1.

Figure 7 is a view partly in elevation and partly in section of the controlling cam and adjacent parts.

Figure 8 is a plan view of a modified form of controlling cam.

Figure 9 is a section on line 9—9, Figure 1.

Figure 10 is a section through the shaft shifting cam on the line 10—10, Figure 4.

Figure 11 is a section on line 11—11, Figure 4.

Figure 12 is a view showing in diagram the position of a lens between the grinding wheels prior to the formation of the bevels.

Figure 13 is a similar view showing the lens after the formation of the bevels.

Figure 4:
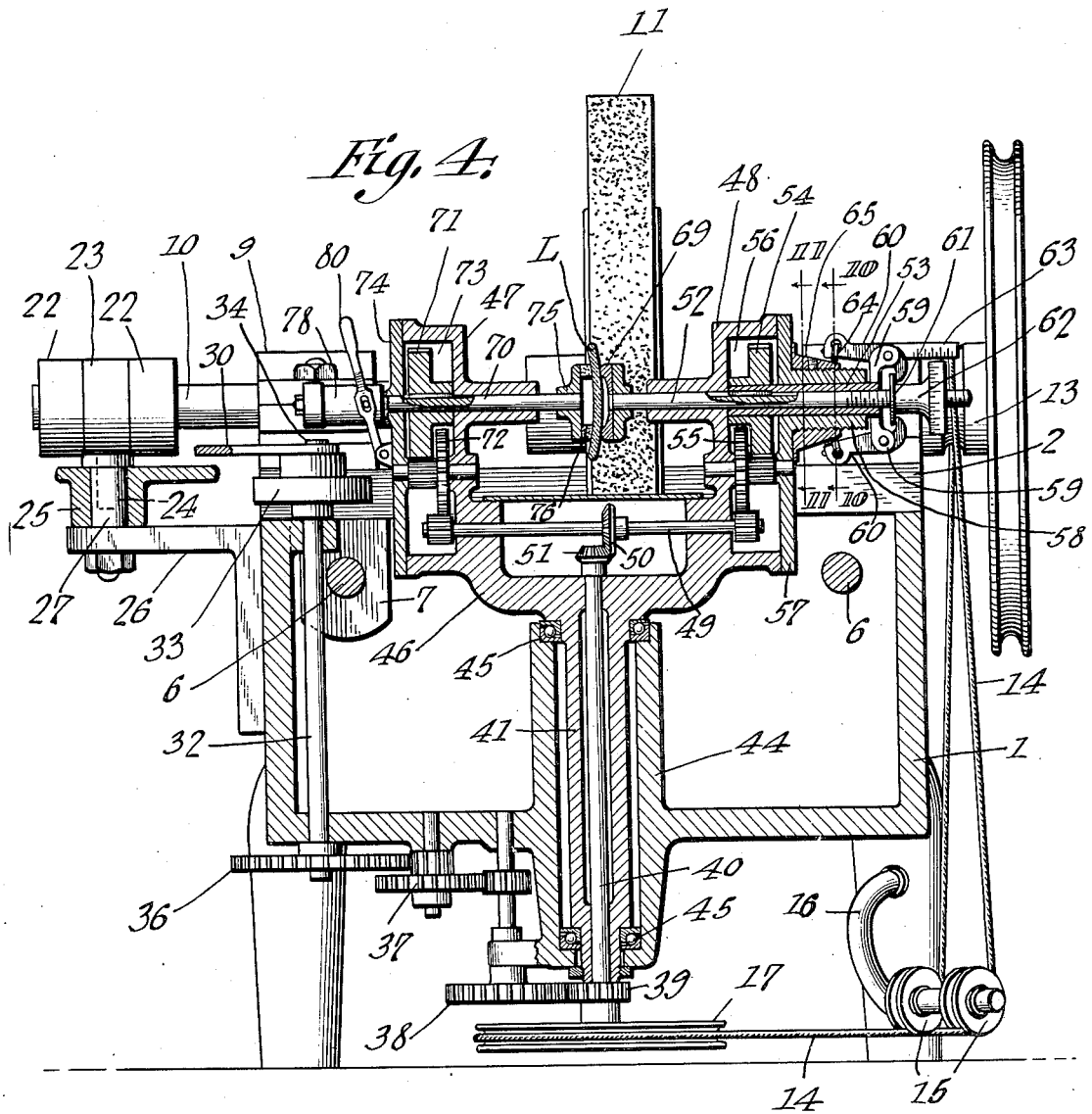
Figure 4 is an enlarged transverse section through the machine, said section being taken through the lens carrying structure and said structure being disposed at right angles to the sides of the machine.
Figure 5:
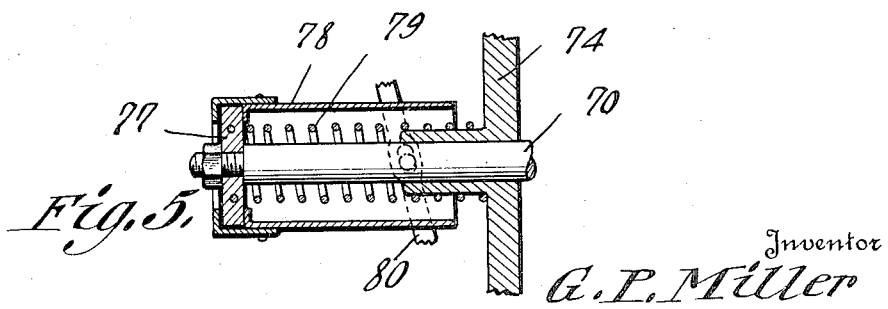
Figure 5 is an enlarged section on line 5—5, Figure 1.

Referring to the figures by characters of reference 1 designates a table provided, on the end portions of the top thereof, with slides 2 and 3 each of which is formed at its outer end with a depending apron or flange 4. Mounted in this flange adjacent the center thereof is an adjusting screw 5. Guide rods 6 are mounted in the table and extend longitudinally thereof, these rods being slidably engaged by a depending flange 7 upon each of the slides 2 and 3. Springs 8 are mounted on the rods between the flanges 7 and the adjacent ends of the table 1 and the depending aprons or flanges 4 are slidably mounted on the end portions of the rods 6 as shown particularly in Figures 2 and 3.

Secured on the slide 2 are bearings 9 in which is journaled a transverse shaft 10 carrying a grinding wheel 11. To one end of this shaft is secured a wheel 12 adapted to receive motion from any suitable source. Another smaller wheel 13 is secured to said end portion of the shaft and is adapted to drive a belt 14 which extends downwardly under guide sheaves 15 carried by a bracket 16 on the lower portion of the table. From these guide sheaves the belt extends horizontally around a grooved wheel 17 as shown particularly in Figures 2 and 4.

Bearings 18 are secured on the slide 3 at the sides thereof and a shaft 19 is journaled therein, this shaft being provided at one end with a wheel 20 for receiving motion from any suitable source. A grinding wheel 21 is secured to the shaft 19, this wheel rotating in a plane parallel with that in which the wheel 11 rotates but being out of line with the wheel 11 so that normally one face of one of the wheels will be in line or substantially in line with the opposed face of the other wheel. This is shown particularly in Figure 1.

It is to be understood that the shafts 10 and 19 are not only adapted to rotate in their bearings 9 and 18 but are also free to slide therein. Those ends of the shafts fartherest removed from the wheels 12 and 20 are provided with collars 22 between which are arranged sleeves 23 having depending fingers 24. These fingers project into the ends of a walking beam 25 which is fulcrumed at its center upon a bracket 26, as shown at 27 in Figure 1. An eccentrically disposed arcuate slot 28 is formed in the walking beam and receives a pivot bolt 29 adapted to be adjusted longitudinally of the slot and clamped upon the walking beam at any desired position along the slot. This particular construction of this pivot bolt is not essential. It might be stated, however, that the bolt is engaged by one end of a pitman 30 and that a spring 31 is mounted on the bolt and bears downwardly on the pivoted end of this pitman. Also the part of said bolt projecting downwardly through slot 28 is eccentrically disposed so as to cause a lengthening and shortening of pitman 30 when the upper knob of bolt 29 is turned, thus allowing relative positioning of the stones.

Journaled in one side of the table 1 is a vertical shaft 32 to the upper end of which is detachably connected a cam 33 which is of the same outline and the same planometric area as the lens to be beveled. An eccentric pivot stud 34 can be extended upwardly from shaft 32 for engagement with the pitman 30 so that when the shaft 32 is rotated the eccentric 33 will be revolved therewith and at the same time a reciprocating motion will be transmitted to the walking beam 25 with the result that the shafts 10 and 19 will be reciprocated back and forth, the amount of movement being dependent upon the position of the pivot bolt 29 within the slot 28, as will be apparent.

It is to be understood that the cam 33 can be removed readily and another substituted therefor which conforms in outline and size with the lens to be ground. The peripheral outline of cam 33 will correspond with the peripheral outline of the lens but the lens will not necessarily be the same size as the cam, that depending on the adjustment of screws 86'. In Figure 1 a circular cam has been illustrated at 33 while in Figure 8 an elliptical cam 35 has been shown.

The lower end of the shaft 32 is provided with a gear 36 forming one end of a train of gears 37, the gear 38 at the other end of this train meshing with a gear 39 secured to a vertical shaft 40 to which the wheel 17 is attached. This shaft 40 is journaled within a tubular stem 41 which is mounted for rotation within a bearing sleeve 44 supported within the table 1, there being suitable anti-friction bearings 45 provided whereby the stem 41 can rotate readily within the sleeve 44. A yoke 46 is provided at the upper end of the stem 41 and is provided with spaced upstanding arms 47 and 48 respectively. A transverse shaft 49 is journaled in the yoke and has a gear 50 adapted to receive motion through a gear 51 from the shaft 40. A shaft 52 is mounted to slide and rotate within the arm 48 and is above and parallel with the shaft 49, this shaft being feathered within a tubular extension 53 to which is secured a gear 54. A train of gears indicated at 55 is employed for transmitting motion from the shaft 49 to the gear 54. This train of gears 55 as well as the gear 54 are seated in a recess 56 in the arm 48 and a cover plate 57 is secured over the recess and constitutes a bearing for the tubular extension 53 of the shaft. An exteriorly screw threaded boss 58 extends from the plate 57 and has the tubular extension 53 journaled therein. Oppositely extending brackets 59 are formed with or secured to the outer ends of the extension 53 and to these brackets are pivotally connected bell cranks 60 the outer ends of which engage a flange 61 formed on a nut 62 threaded on the projecting end of the shaft 52. The periphery of the nut can be graduated as shown and works close to and across the edge of a graduated finger 63 extending from one of the brackets 59. The inner ends of the bell cranks 60 carry rollers 64 and these rollers are adapted to ride around a tapered cam 65 which is screwed onto the threaded boss 58. The outer or small end of this cam is circular, as shown particularly in Figure 10 while the innermost portion of the cam is elliptical as shown in Figure 11. This elliptical inner end is surrounded by a circular flange 66 carrying graduations as shown at 67 in Figure 11, there being a fixed indicator 68 on the cover plate 57 and adjacent the graduated edge of the flange 66 as shown in Figure 11. Obviously by rotating the cam 65 it can be adjusted toward or away from the outer end of the boss 58, thus causing the rollers 64 to move farther apart or closer together and correspondingly shift the nut 62 and the shaft 52. By adjusting the cam 65 so as to bring an oval portion thereof between the rollers 64 it will be apparent that as these rollers travel around the cam the bell cranks 60 will push against and subsequently move away from the flange 61 so that a back and forth reciprocation of the shaft 52 will thus be set up. The shaft can be adjusted to a normal or initial position by rotating the nut 62 thus to pull the shaft outwardly or press it inwardly.

Connected to the inner end of the shaft 52 is a clutch face or chuck 69 formed of a suitable non-yielding material which will not, however, scratch or otherwise mutilate the face of a glass lens engaged thereby.

Journaled in the other arm 47 of the yoke 46 is a shaft 70 which aligns with the shaft 52 and is feathered in a gear 71. This gear receives motion through a train of gears 72 from the shaft 49. The gear 71 as well as the train of gears 72 is housed with a recess 73 in the arm of the yoke and said recess is provided with a covering plate 74 in which the shaft 70 is journaled. A head 75 is provided at the inner end of the shaft 70 and is provided with a soft lens engaging portion 76 whereby a lens, indicated generally at L may be held firmly against the unyielding member 69 on the shaft 52.

Connected to the outer end of the shaft 70 is a ring 77 in which the shaft is designed to rotate. This ring has a housing 78 extending therefrom and around the projecting portion of the shaft, there being a "pull" spring 79 within the housing and secured at one end to the ring 77 and at its other end to the plate 74. A lever 80 is fulcrumed on the plate 74 and is pivotally connected to the housing 78. It will be apparent that the spring 79 holds the shaft 70 normally pressed inwardly. When it is desired to pull the shaft 70 outwardly so as to release the held lens L, it is merely necessary to pull on the lever 80.

As shown in the drawings a spring 81 is connected to one of the arms 47 so as to pull thereon and tend to move the yoke to position at right angles to the sides of the machine. This movement, however, is limited by a gage finger 82 mounted on the opposite side of the table 1 and adjustably held by a bolt 83 extending through the side of the table. See Figure 9. This table may be graduated to indicate the amount of movement of the gage finger. The finger is adapted to be contacted by one of the arms 47 under normal conditions and as shown in Figure 1. By means of this gage the parts can be set so that the grinding of the lens will cease when the bevel produced has reached a predetermined angle.

Formed within each of the slides 2 and 3 is a longitudinal channel 84 in which a bar 85 is mounted to slide. This bar is provided at its inner end with a roller 86 normally contacting with the cam 33. The outer end of the bar is adapted to abut against a stop screw 86' mounted in the end of the slide. A series of graduations may be formed on each bar, as indicated at 87, these graduations being readable in connection with an index or pointer 88 mounted on the slide. Furthermore the head of each of the screws 86' may be graduated, as shown at 89, this graduated head working close to a graduated finger 90 extending from the slide and indicating the size of finished lens especially when the lens is to be larger or smaller than cam 33.

Arranged within each end of the table is a dressing point indicated at 91 and which can be of a material sufficiently hard to smooth off the surface of the adjacent grinding wheel when said wheel is brought thereagainst. These dressing points 91 are so positioned that when the adjacent wheel 11 or 21 is shifted outwardly it will be brought thereagainst and can then be moved laterally thereacross by the movement of the shafts 10 and 19 respectively.

When it is desired to use this machine a cam of the shape of the lens to be beveled is placed on the upper end of the shaft 32 with its smallest diameter between the rollers 86. The screws 86' are then adjusted against the outer ends of the bars 85 so that when the cam 33 is rotated it will, if of any shape other than circular, cause the rollers 86 to move apart, thus moving the slides 2 and 3 away from each other and against the action of the springs 8 after which said springs will serve to return the slides and the rollers to their initial positions. With the parts thus adjusted the lens to be beveled is placed between the members 69 and 76 by shifting lever 80 outwardly, inserting the lens accurately upon the member 69, and then allowing the member 76 to press against the lens as shown in Figure 4. If the edge of the lens is of uniform thickness the cam 65 is adjusted to bring the circular portion thereof between the rollers 64. If, however, the edge of the lens is of variable thickness the cam 65 is adjusted outwardly to bring the proper portion of its elliptical section between the rollers, the proper positioning of this cam being indicated by the graduations or scales 67. When the elliptical portion of the cam 65 is positioned between the rollers 64 it will be apparent that as these rollers travel around said elliptical portion of the cam 65 they will move inwardly and outwardly, thus alternately releasing and pressing inwardly upon the collar 61 and producing a back and forth movement of the shaft 52 and of the lens pressed against the member 69. By means of the nut 62 the shaft 52 can be adjusted longitudinally in order to properly position the lens before the grinding operation begins.

It will be noted that after the lens has been placed in the holder provided therefor the yoke can be released and the spring 81 will pull thereagainst so as to bring the opposite corners of the edge of the lens in contact with the grinding faces of the respective wheels 11 and 21 as shown in Figure 12. When the mechanism is set in operation the wheels 11 and 21 rotate and quickly grind away those portions of the lens contacting therewith, the wheel 11 producing one bevel on the lens while, at the same time, the wheel 21 is producing the other bevel. Thus as the parts are ground the yoke is gradually shifted by the spring 81 until the ultimate bevel is obtained whereupon one arm of the yoke will come against the stop finger or gage 82 which has previously been set to determine the angles of the bevels to be formed. As the grinding wheels are rotating so as to produce the bevels, the lens is being slowly revolved by the shafts 52 and 70 which receive their motion through the trains of gears indicated at 55 and 72. At the same time the rotating shaft 32 will cause the walking beam 25 to oscillate and the shafts 10 and 19 are thus reciprocated slowly, causing the grinding faces of the wheels to move back and forth during the rotation of the wheels and thus distributing the wear over all parts of the faces of the wheels. Should the lens be elliptical, the rotation of the elliptical cam 35 substituted for the cam 33 will result in the moving of the wheels 11 and 21 toward and from each other as they rotate and as they reciprocate laterally so that the lens, as completed, will be of a similar shape as the cam and will have both its faces beveled. As has heretofore been explained should the edge of the lens be of variable thickness the action of the cam 65 upon the rollers 64 would be such as to automatically shift the shaft 52 during the rotation of the lens.

It is to be understood that various mechanisms other than that described can be employed for attaining the objects set forth. The features of primary importance in the present invention are the positioning of the lens between two grinding wheels which operate simultaneously to produce opposed bevels on the lens. Another feature to which importance is attached is the combined longitudinal, lateral and rotary motion imparted to the grinding wheels while acting on the lens so as to distribute wear upon the wheels. A further object of importance is the particular manner of supporting the lens whereby the same is rotated while held at an angle to the plane of rotation of the grinding wheels, it being possible at the same time to shift the lens laterally along its axis of rotation while thus held.

Should the grinding wheels become worn so as not to function properly, the slides 2 and 3 can be adjusted apart so as to bring the grinding faces of the wheels against the cutting point 91. By then rotating the wheels and at the same time causing them to reciprocate laterally, the grinding faces will be dressed down, as will be apparent.

What is claimed is:—

1. In a machine of the class described the combination of means for simultaneously beveling the opposite faces of a lens at diametrically opposite portions of the edge thereof and yielding means for pressing said edge portions of the lens against the beveling means.

2. In a machine of the class described the combination with means for holding and rotating a lens, of means for simultaneously beveling opposite faces of the lens at diametrically opposite portions of the edge thereof and yielding means for shifting the lens holding means to press the edge portions of the lens against the beveling means.

3. In a machine of the class described the combination with lens holding means mounted for rotation, of opposed grinding wheels for engagement with opposite faces of the held lens at diametrically opposed portions of the edge thereof, and means for simultaneously rotating and laterally reciprocating the wheels to simultaneously bevel the two faces of the lens at the edge thereof.

4. In a machine of the class described the combination with spaced grinding wheels mounted for rotation about parallel axes, of means for supporting a lens for rotation between the peripheries of the grinding wheels and in a plane of rotation at an angle to the planes of rotation of the grinding wheels, and yielding means for rotating the lens supporting means about an axis intersecting the axis of rotation of the lens, to press the periphery of the lens yieldingly against the peripheries of the wheels.

5. The combination with spaced grinding wheels, of means for supporting a lens between the grinding wheels and at an angle to the plane of rotation of the wheels, yielding means for shifting the lens supporting means to hold the marginal portion of the lens in contact with the grinding wheels, and means for moving the grinding wheels toward and from each other to maintain them in contact with a lens of an outline other than circular.

6. The combination with spaced grinding wheels, of rotatable means for supporting a lens between the grinding wheels and at an angle to the plane of rotation of the wheels, means for rotating the lens supporting means yielding means for shifting the lens supporting means to hold the marginal portion of the lens in contact with the grinding wheels, and means for moving the grinding wheels toward and from each other to maintain them in contact with a lens of an outline other than circular, said means including a cam of the same outline as the lens being acted on and means operated by the cam for transmitting sliding motion to the wheels, said cam and lens rotating synchronously.

7. The combination with grinding elements mounted for rotation, of means for rotatably supporting a lens between said elements and at an angle to the planes of rotation thereof, yielding means for shifting the lens supporting means to hold opposite portions of the lens in contact with the respective grinding elements, a cam mounted for rotation, said cam being of the same outline as the lens, and means operated by the rotation of the cam for moving the grinding elements toward and from each other to properly bevel the lens supported therebetween, said cam and lens rotating synchronously.

8. The combination with spaced grinding elements mounted for rotation, of means for supporting a lens between said elements and at an angle to their planes of rotation, means for rotating the lens, yielding means for shifting the lens supporting means to hold opposite portions of the lens in contact with the grinding elements, a cam of the same outline as the lens, means for rotating the cam, means for transmitting motion from the cam to the grinding elements to move said elements toward and from each other during their rotation thereby to adapt them to the shape of the lens supported therebetween and to produce uniform bevels upon the lens, and means for reciprocating the grinding elements laterally during their rotation and relative sliding movement.

9. In a machine of the class described the combination of means for simultaneously beveling opposite faces of the lens at diametrically opposite portions of the edge thereof, means for predetermining the lateral position of the lens in relationship to said beveling means so that the bevel will be equal on both sides, and yielding means for holding and rotating the lens and pressing the diametrically opposite marginal portions of the lens against the respective beveling means.

10. The combination with opposed grinding elements mounted for rotation, of rotatable means for supporting a lens therebetween for rotation about its individual axis and at an angle to the plane of rotation of said elements, yielding means for shifting the lens supporting means to hold opposite portions of the lens in contact with the respective grinding elements, adjustable means for limiting the movement of the lens under the action of said yielding means, a rotatable cam conforming with the peripheral contour of the lens, and means shiftable by the cam for moving the grinding elements from and toward each other in timed relation with the rotating lens.

In testimony that I claim the foregoing as my own, I have hereto affixed my signature in the presence of two witnesses.

GEORGE P. MILLER.

Witnesses:
HAROLD M. HAYES,
LOLA B. HAYES.